(12) United States Patent
Onishi et al.

(10) Patent No.: US 9,000,645 B2
(45) Date of Patent: Apr. 7, 2015

(54) ROTATING ELECTRICAL MACHINE

(75) Inventors: Toshiyuki Onishi, Chiyoda-ku (JP);
Masafumi Okazaki, Chiyoda-ku (JP);
Katsumi Ohata, Chiyoda-ku (JP); Akio Fujiwara, Chiyoda-ku (JP); Wataru Hirosue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 13/805,934

(22) PCT Filed: May 19, 2011

(86) PCT No.: PCT/JP2011/061517
§ 371 (c)(1),
(2), (4) Date: Dec. 20, 2012

(87) PCT Pub. No.: WO2012/035824
PCT Pub. Date: Mar. 22, 2012

(65) Prior Publication Data
US 2013/0093277 A1 Apr. 18, 2013

(30) Foreign Application Priority Data
Sep. 13, 2010 (JP) ................................. 2010-204598

(51) Int. Cl.
*H02K 21/26* (2006.01)
*H02K 1/18* (2006.01)
(Continued)

(52) U.S. Cl.
CPC .................. *H02K 1/185* (2013.01); *H02K 1/17* (2013.01); *H02K 23/04* (2013.01)

(58) Field of Classification Search
CPC .................. H02K 23/04; H02K 1/17

USPC ............. 310/154.01, 154.13, 154.14, 154.15
See application file for complete search history.

(56) References Cited

U.S. PATENT DOCUMENTS 4,587,449 A * 5/1986 West ......................... 310/154.27
5,105,114 A * 4/1992 Sickle et al. ............. 310/154.13
(Continued)

FOREIGN PATENT DOCUMENTS

JP 61-129472 U 8/1986
JP 09-322443 A 12/1997
(Continued)

OTHER PUBLICATIONS

International Search Report of PCT/JP2011/061517 dated Aug. 16, 2011.

*Primary Examiner* — Hanh Nguyen
(74) *Attorney, Agent, or Firm* — Sughrue Mion, PLLC; Richard C. Turner

(57) ABSTRACT

The rotating electrical machine of the present invention includes: a magnet holder made of a non-magnetic material, which is formed by coupling a columnar portion for retaining the permanent magnet in a circumferential direction, and an annular portion for covering each axial side surface of the permanent magnet. The magnet holder includes, on an outer diameter side of both circumferential side surfaces of the columnar portion, engaging portions which engage with respective locking portions of the magnet cover, and includes, on an inner diameter side of each of both the circumferential side surfaces of the columnar portion, an extending portion extending along an inner peripheral surface of the magnet cover with a clearance (D) with respect to the inner peripheral surface of the magnet cover.

6 Claims, 23 Drawing Sheets

(51) Int. Cl.
*H02K 1/17* (2006.01)
*H02K 23/04* (2006.01)

(56) References Cited

U.S. PATENT DOCUMENTS 6,060,799 A * 5/2000 McManus et al. ............ 310/43

7,091,642 B2 * 8/2006 Agnes et al. ............ 310/154.12

FOREIGN PATENT DOCUMENTS

| JP | 2003-070190 A | 3/2003 |
| JP | 2003-189512 A | 7/2003 |

* cited by examiner

V—V CROSS SECTION

ROTATING ELECTRICAL MACHINE

CROSS REFERENCE TO RELATED APPLICATIONS

This application is a National Stage of International Application No. PCT/JP2011/061517 filed May 19, 2011, claiming priority based on Japanese Patent Application No. 2010-204598 filed Sep. 13, 2010, the contents of all of which are incorporated herein by reference in their entirety.

TECHNICAL FIELD

The present invention relates to a rotating electrical machine which uses a permanent magnet as a stator.

BACKGROUND ART

There is known a rotating electrical machine which uses a permanent magnet as a stator, in which consideration is made so that, even when the permanent magnet is damaged due to shock and the like from the outside, a fragment of the permanent magnet does not cause rotation failure of an armature serving as a rotor. Conventionally, as a rotating electrical machine of this type, there has been proposed a field device of a rotating electrical machine described in Patent Literature 1. The rotating electrical machine described in Patent Literature 1 includes a magnet cover formed of a thin plate, which covers an inner diameter portion (inner peripheral surface) and both circumferential side surfaces of the permanent magnet, and a magnet holder including retaining portions interposed between the respective permanent magnets, for retaining the respective permanent magnets in a circumferential direction, and annular portions located at both axial end portions of each permanent magnet, for retaining the respective permanent magnets in an axial direction. The magnet cover includes locking portions nat both circumferential end portions thereof, and the retaining portion of the magnet holder includes an engaging portion which engages with the locking portion of the magnet cover. The engaging portion engages with the locking portion of the magnet cover, and thus the permanent magnet and the magnet cover are retained and fixed in an inner diameter direction. Therefore, even when the permanent magnet is damaged, the magnet cover covers the inner peripheral surface and both the circumferential side surfaces of the permanent magnet, and hence the fragment of the permanent magnet does not fly into the armature, and rotation failure of the armature is prevented.

CITATION LIST

Patent Literature

[PTL 1] JP 09-322443 A

SUMMARY OF INVENTION

Technical Problem

The magnet cover forming the rotating electrical machine described in Patent Literature 1 is provided between the permanent magnet and the armature serving as the rotor. In order to suppress performance reduction of the rotating electrical machine including this permanent magnet and rotor, the magnet cover is formed of, for example, a thin plate made of a non-magnetic material and having a thickness of about 0.1 mm. Therefore, when the magnet cover is deformed, there is a risk that the magnet cover may come into contact with the rotor. Further, the engagement between the locking portion provided to the magnet cover and the engaging portion provided to the retaining portion of the magnet holder determines the fitting position of the magnet cover. Therefore, when dimensional variations occur in radial length of the magnet cover and the like, there is a risk that the engagement between the magnet cover and the magnet holder becomes insufficient, or in some cases, the engagement between the magnet cover and the magnet holder is cancelled, which may cause movement of the magnet cover in the inner diameter direction to cause contact to the rotor. In order to prevent deformation of the magnet cover and suppress dimensional variations of the magnet cover, measures such as strict management of the magnet cover are necessary, which leads to a problem of increase in product cost.

Further, FIGS. 5 and 6 of Patent Literature 1 illustrate, as a conventional device, a rotating electrical machine in which a protruding portion is provided to the retaining portion of the magnet holder on the inner diameter side thereof, for retaining the positions of the permanent magnet and the magnet cover in the inner diameter direction. This conventional device does not include the engaging portion, and the magnet cover comes into contact with the protruding portion of the magnet holder, to thereby fix the magnet cover and the permanent magnet in a radial direction. Loads of the permanent magnet and the magnet cover act on the protruding portion, and hence there has been a problem in that the protruding portion is deformed to be brought into contact with the rotor.

The present invention has been made to solve the above-mentioned problems, and has an object to provide a rotating electrical machine which uses a permanent magnet and has further improved reliability, in which, even when deformation or dimensional variations of a magnet cover occur, the magnet cover and the like do not come into contact with a rotor, and a fragment of the permanent magnet and the magnet cover do not fly toward the rotor.

Solution to Problem

A rotating electrical machine according to the present invention includes a magnet holder made of a non-magnetic material, which is formed by coupling an annular portion for covering each axial side surface of a permanent magnet and a columnar portion provided between adjacent permanent magnets, for retaining the permanent magnet in a circumferential direction. The magnet holder includes, on an outer diameter side of both circumferential side surfaces of the columnar portion, engaging portions which engage with locking portions provided to the magnet cover. The magnet holder includes, on an inner diameter side of each of both the circumferential side surfaces of the columnar portion, a first extending portion extending toward an inner peripheral surface of the magnet cover with a clearance with respect to the inner peripheral surface of the magnet cover.

Advantageous Effects of Invention

According to the present invention, the columnar portion forming the magnet holder retains the permanent magnet in the circumferential direction. On the outer diameter side of both the circumferential side surfaces of the columnar portion, the engaging portions which engage with the respective locking portions of the magnet cover are provided, and on the inner diameter side of each of both the circumferential side surfaces of the columnar portion, the first extending portion extending toward the inner peripheral surface of the magnet cover is provided with a clearance with respect to the inner peripheral surface of the magnet cover. With this configuration, it is possible to provide the rotating electrical machine with further improved reliability, in which, even when deformation or dimensional variations of the magnet cover occur, the magnet cover and the like do not come into contact with the rotor, and the fragment of the permanent magnet and the magnet cover do not fly toward the rotor.

DESCRIPTION OF EMBODIMENTS

First Embodiment

Figure 1:
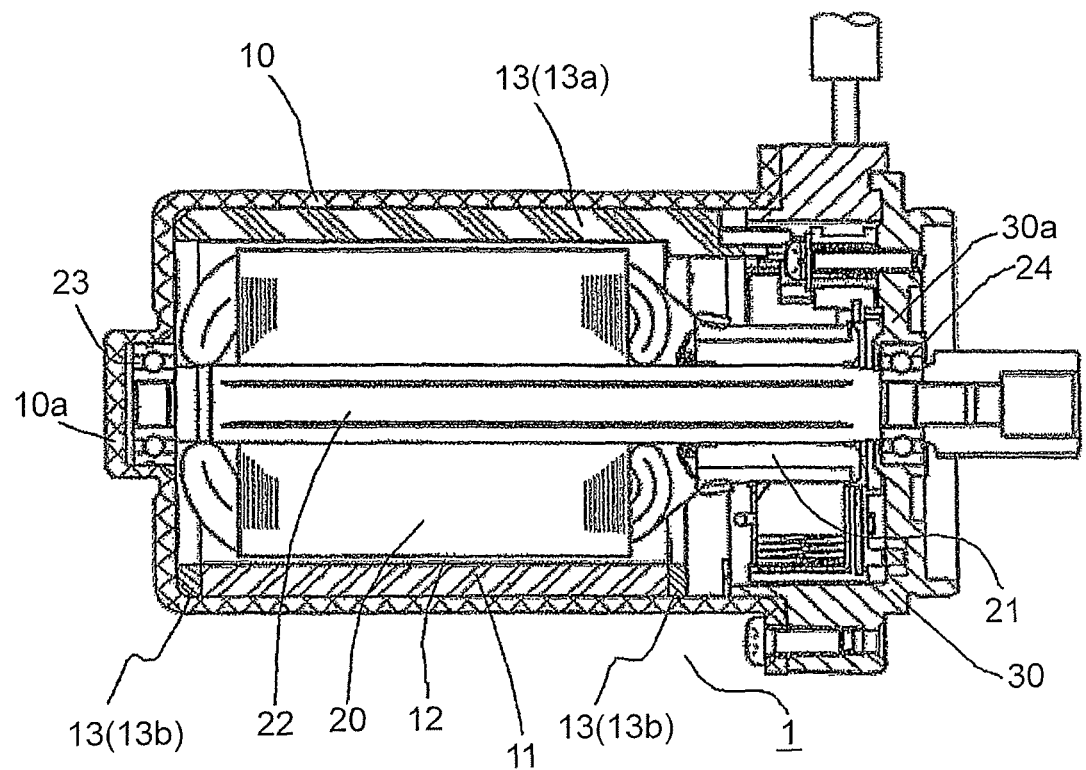
FIG. 1 A sectional view of a brushed motor 1 according to a first embodiment of the present invention.
Figure 2:
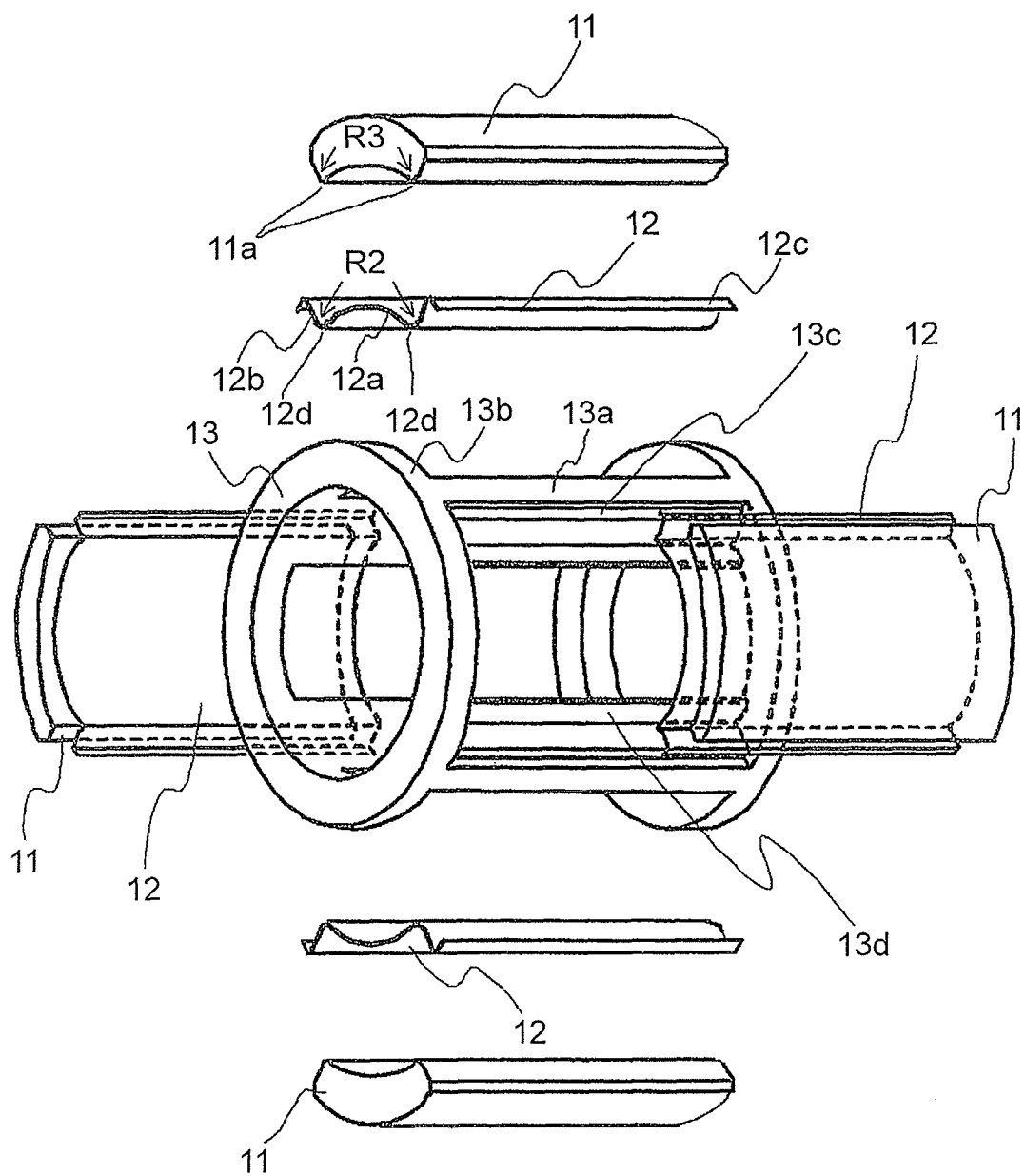
FIG. 2 A configuration view illustrating assembly of permanent magnets 11 of the brushed motor 1 according to the first embodiment of the present invention.
Figure 3:
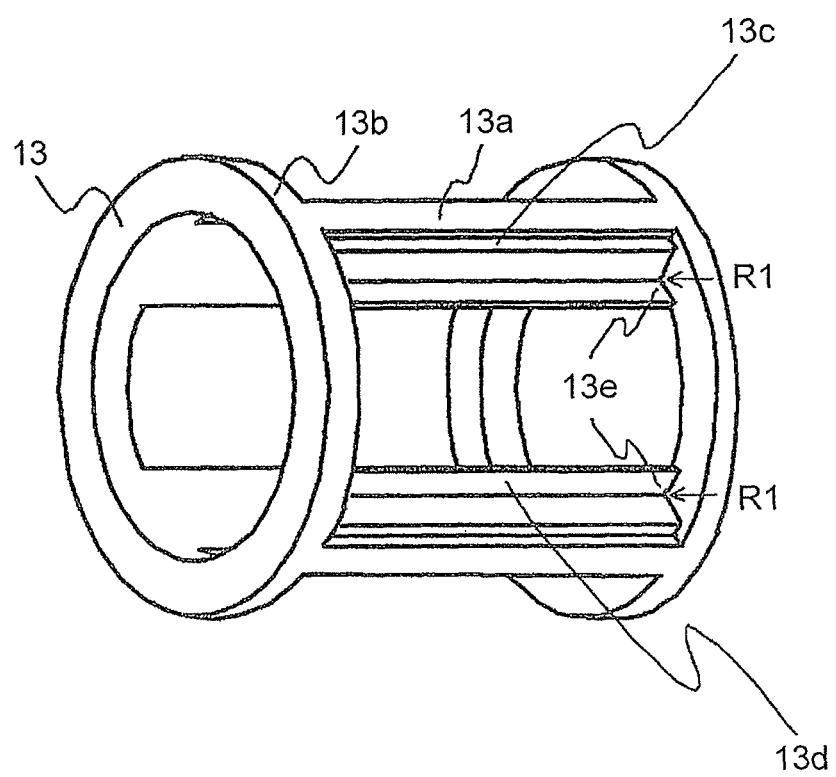
FIG. 3 A perspective view of a magnet holder 13 illustrated in FIG. 2.

FIG. 1 is a sectional view of a brushed motor 1, which is an example of a rotating electrical machine, according to a first embodiment of the present invention. FIG. 2 is a configuration view illustrating assembly of permanent magnets 11 of the brushed motor 1 according to the first embodiment of the present invention. FIG. 3 is a perspective view of a magnet holder 13 illustrated in FIG. 2. Note that, in the following drawings, the same or corresponding parts are denoted by the same reference symbols.

As illustrated in FIG. 1, the brushed motor 1 includes a yoke 10 having a bottomed cylindrical shape, four permanent magnets 11 made of a ceramic-based material such as ferrite, which are arranged along an inner peripheral surface of the yoke 10 at predetermined intervals in a circumferential direction, and a rotor 20 which rotates on inner peripheral sides of the respective permanent magnets 11. A corner portion 11a of the permanent magnet 11, which is formed between an inner peripheral surface and a circumferential side surface thereof, has a round shape, and a curvature radius of the corner portion 11a is R3. The rotor 20 and a commutator 21 are fixed to a shaft 22. The shaft 22 is supported in a freely rotatable state by a rear bearing 23 retained in a bearing case portion 10a provided in the yoke 10 and a front bearing 24 retained in a bearing case portion 30a provided in a housing 30. Note that, in the first embodiment of the present invention, description is made of a case where the number of the permanent magnets 11 is 4, but the number of the permanent magnets 11 is not limited to 4, and it is only required that a plurality of permanent magnets be provided.

The inner peripheral surface and both circumferential side surfaces of each of the permanent magnets 11 are covered with a magnet cover 12 formed of a thin plate made of a non-magnetic metal such as stainless-steel. As illustrated in FIG. 2, the magnet cover 12 includes an arc portion 12a for protecting the inner peripheral surface of the permanent magnet 11, end surface portions 12b for protecting both the circumferential side surfaces of the permanent magnet 11, and locking portions 12c bent at both end portions of the respective end surface portions 12b. Further, a corner portion 12d formed between the arc portion 12a (inner peripheral surface of the magnet cover 12) and the end surface portion 12b (circumferential side surface of the magnet cover 12) has a round shape, and a curvature radius of the corner portion 12d is R2.

Further, the permanent magnet 11 is retained at the inner peripheral surface of the yoke 10 by the magnet holder 13 made of a non-magnetic material (for example, made of a resin). As illustrated in FIG. 2, the magnet holder 13 is formed by coupling, by integral molding, columnar portions 13a each provided between adjacent permanent magnets 11, for retaining and fixing the permanent magnets 11 in the circumferential direction by press-fitting and the like, and annular portions 13b for covering both axial side surfaces of each of the permanent magnets 11. When the locking portions 12c of the magnet cover 12 engage with engaging portions 13c of the magnet holder 13, the magnet cover 12 is housed in a space defined by the columnar portions 13a and the annular portions 13b of the magnet holder 13. Then, the permanent magnet 11 is inserted so that the arc portion 12a of the magnet cover 12 covers the inner peripheral surface of the permanent magnet 11, and in addition, the end surface portions 12b of the magnet cover 12 cover both the circumferential side surfaces of the permanent magnet 11. In this manner, the permanent magnet 11 is fitted to the inner peripheral surface of the yoke 10 (see FIG. 1).

Figure 4:
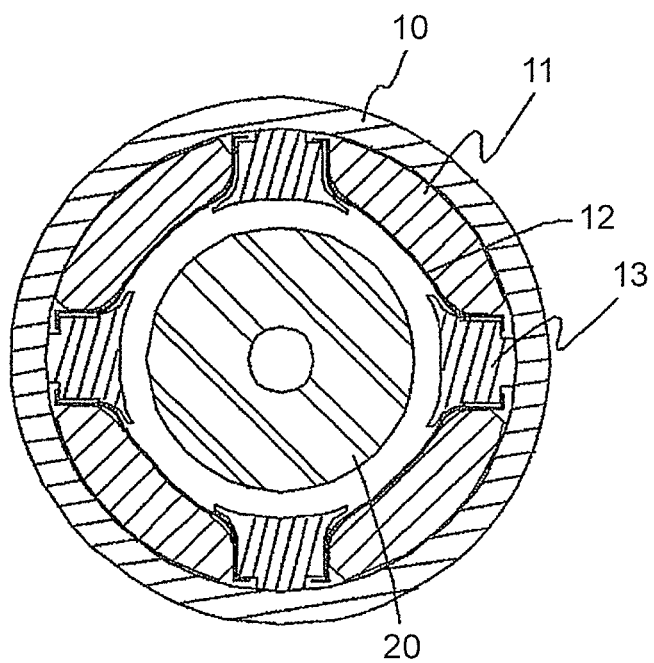
FIG. 4 A sectional view of the brushed motor 1 according to the first embodiment of the present invention as viewed in an axial direction.
Figure 5:
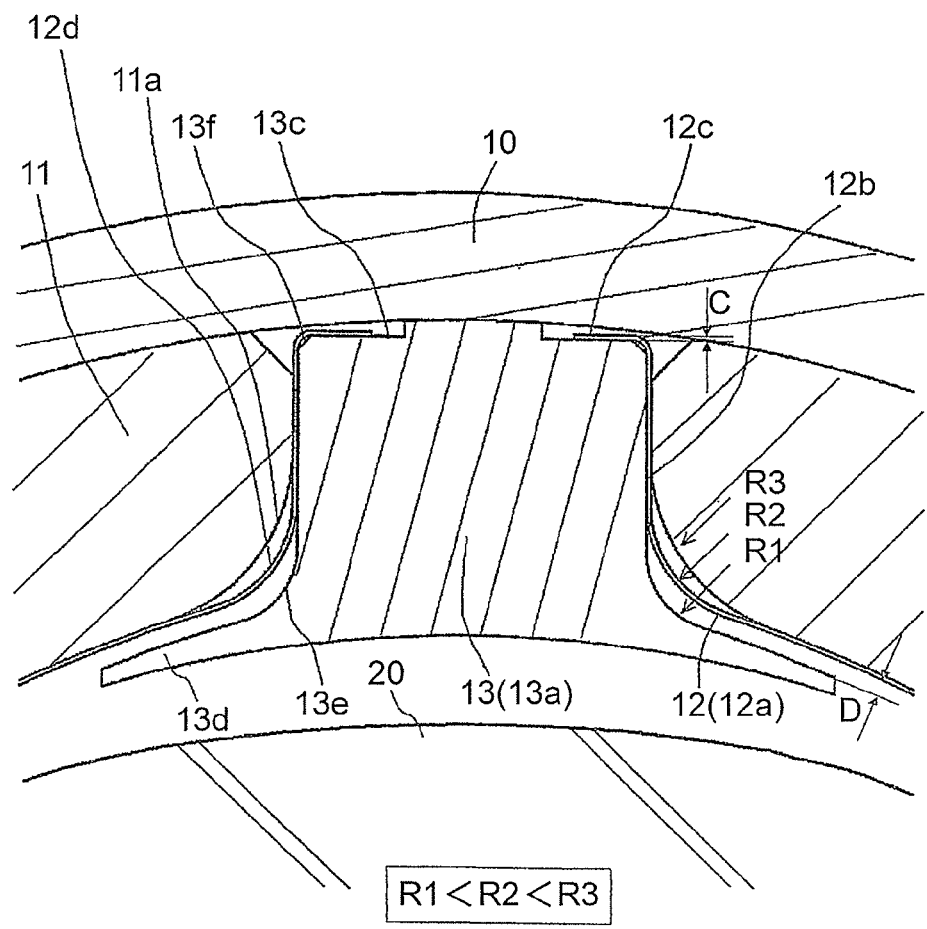
FIG. 5 An enlarged view of the vicinity of a columnar portion 13a of the magnet holder 13 illustrated in FIG. 4.

FIG. 4 is a sectional view of the brushed motor 1 according to the first embodiment of the present invention as viewed in the axial direction. FIG. 5 is an enlarged view of the vicinity of the columnar portion 13a of the magnet holder 13 illustrated in FIG. 4. As illustrated in FIG. 5, on the yoke 10 side of the columnar portion 13a, that is, on an outer diameter side of both the circumferential side surfaces thereof, the engaging portions 13c which engage with the respective locking portions 12c of the magnet cover 12 are provided. Further, on the rotor 20 side of the columnar portion 13a, that is, on an inner diameter side of both the circumferential side surfaces thereof, there is provided extending portions 13d each extending toward the inner peripheral surface of the magnet cover 12. A clearance D is provided between the extending portion 13d and the inner peripheral surface of the magnet cover 12, and normally, the extending portion 13d does not come into contact with the magnet cover 12. A corner portion 13e formed between the circumferential side surface of the columnar portion 13a and the extending portion 13d has a round shape, and a curvature radius of the corner portion 13e is R1. R1, R2, and R3 establish the relationship of R1<R2<R3. Further, a corner portion 13f formed between the circumferential side surface of the columnar portion 13a and the engaging portion 13c is chamfered. Note that, the gap dimension between the engaging portion 13c of the magnet holder 13 and the inner peripheral surface of the yoke 10 is C.

In the brushed motor 1 according to the first embodiment of the present invention, which is configured as described above, the permanent magnets 11 are retained and fixed between the magnet cover 12 and the yoke 10. When the locking portions 12c of the magnet cover 12 engage with the engaging portions 13c of the magnet holder 13, the fitting position of the magnet cover 12 is determined. Thus, the magnet cover 12 does not move in the inner diameter direction any further, and hence the magnet cover 12 does not come into contact with the rotor 20, which prevents the rotation failure of the rotor 20.

Figure 6:
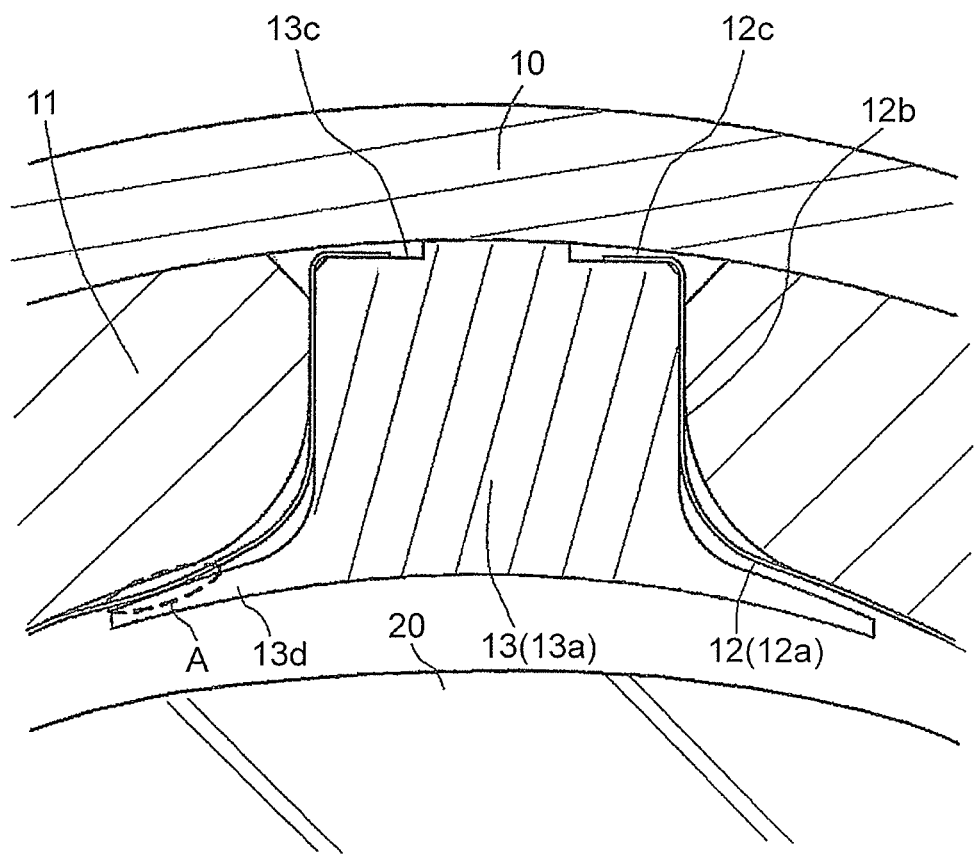
FIG. 6 An enlarged view of the vicinity of the columnar portion 13a when a magnet cover 12 illustrated in FIG. 5 is deformed.

Further, for example, in a case where a part of the arc portion 12a of the magnet cover 12 is significantly deformed as illustrated in FIG. 6, the deformed position (part A in FIG. 6) moves in the inner diameter direction, but the deformed position comes into contact with the extending portion 13d of the magnet holder 13, which prevents further movement of the magnet cover 12 in the inner diameter direction. Therefore, the magnet cover 12 does not come into contact with the rotor 20, and it is possible to prevent the rotation failure of the rotor 20. Further, as described above, the permanent magnet 11 is retained and fixed by the columnar portions 13a of the magnet holder 13 in the circumferential direction, and is retained and fixed to the inner peripheral surface of the yoke 10 by the magnetic force of the permanent magnet 11. Therefore, even when the magnet cover 12 is deformed and the deformed position comes into contact with the extending portion 13d of the magnet holder 13, a load of the permanent magnet 11 does not act on the extending portion 13d, and hence the extending portion 13d is not deformed. Therefore, the extending portion 13d does not come into contact with the rotor 20, and it is possible to prevent the rotation failure of the rotor 20. Therefore, even when the magnet cover 12 is deformed, the magnet cover 12 and the extending portion 13d provided to the magnet holder 13 do not come into contact with the rotor 20, and it is possible to prevent the rotation failure of the rotor 20. In a case where the degree of deformation of the arc portion 12a of the magnet cover 12 is smaller than that in the case illustrated in FIG. 6, the clearance D is provided between the inner peripheral surface of the magnet cover 12 and the extending portion 13d, and hence the magnet cover 12 does not come into contact with the extending portion 13d because the clearance D is provided, and the force that acts on the extending portion 13d can be reduced as compared to the case where the clearance D is absent.

Figure 7:
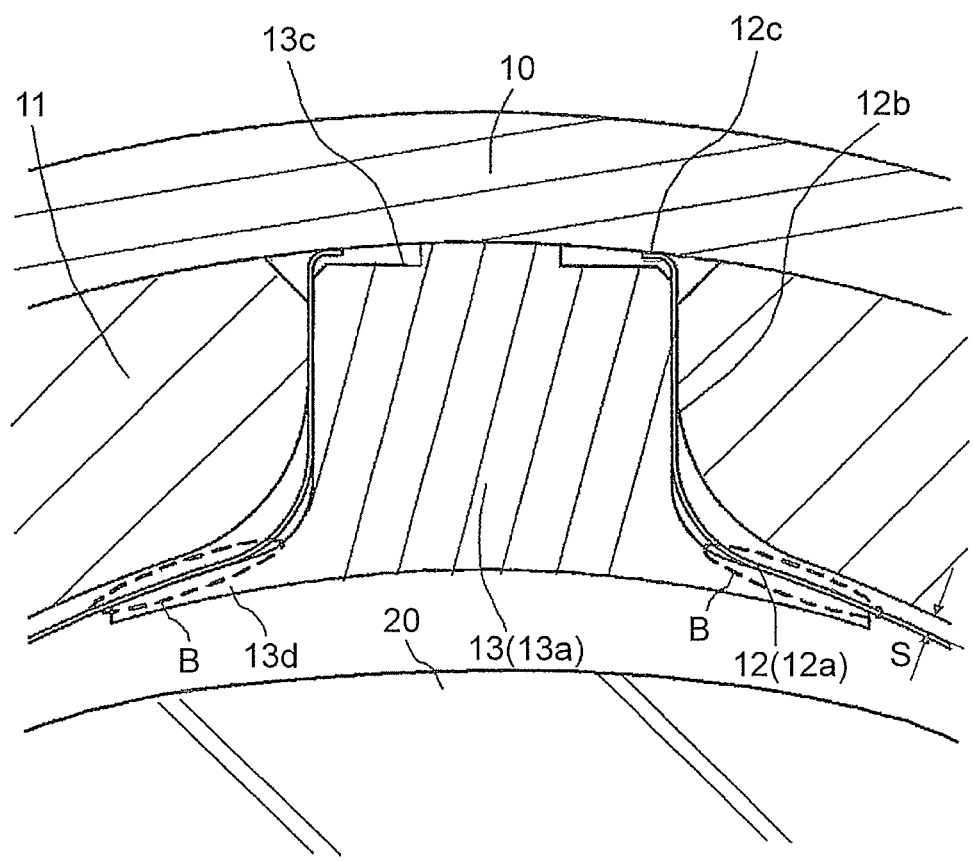
FIG. 7 An enlarged view of the vicinity of the columnar portion 13a when dimensional variations of an end surface portion 12b of the magnet cover 12 illustrated in FIG. 5 occur.

Further, when there are variations in circumferential length of the locking portion 12c of the magnet cover 12, the part of the locking portion 12c for engagement is gradually reduced, and thus the engagement between the locking portion 12c and the engaging portion 13c becomes shallow, but the magnet cover 12 moves in the inner diameter direction while maintaining the engagement between the locking portion 12c and the engaging portion 13c. The magnet cover 12 moves in the inner diameter direction until a part of the arc portion 12a of the magnet cover 12, which is close to the end surface portion 12b, comes into contact with the extending portion 13d of the magnet holder 13, but even in this case, as long as the engagement between the locking portion 12c and the engaging portion 13c is maintained, the magnet cover 12 does not come into contact with the rotor 20 as described above. However, when larger variations occur and, for example, as illustrated in FIG. 7, the locking portion 12c does not engage with the engaging portion 13c, the magnet cover 12 moves in the inner diameter direction up to a position at which the part of the arc portion 12a of the magnet cover 12, which is close to the end surface portion 12b, comes into contact with the extending portion 13d (see part B of FIG. 7). However, the magnet cover 12 does not move in the inner diameter direction any further. Therefore, the magnet cover 12 does not come into contact with the rotor 20, and it is possible to prevent the rotation failure of the rotor 20. Further, from the same reasons as described above, even when the magnet cover 12 comes into contact with the extending portion 13d of the magnet holder 13, the extending portion 13d is not deformed. Therefore, the magnet cover 12 and the extending portion 13d do not come into contact with the rotor 20, and it is possible to prevent the rotation failure of the rotor 20.

From the description above, it can be said that the extending portion 13d of the magnet holder 13 restricts the position of the magnet cover 12 so that the magnet cover 12 does not move in the inner diameter direction with respect to the position at which the magnet cover 12 comes into contact with the extending portion 13d, and plays a role as a stopper for suppressing the movement of the magnet cover 12 in the inner diameter direction.

Further, as described above, the permanent magnet 11 is retained and fixed by the columnar portions 13a of the magnet holder 13 in the circumferential direction, and is retained and fixed to the inner peripheral surface of the yoke 10 by the magnetic force of the permanent magnet 11. Therefore, even when the part of the arc portion 12a of the magnet cover 12, which is close to the end surface portion 12b, comes into contact with the extending portion 13d provided to the magnet holder 13, the extending portion 13d is not deformed. Therefore, the extending portion 13d does not come into contact with the rotor 20, and it is possible to prevent the rotation failure of the rotor 20.

As described above, the rotating electrical machine according to the first embodiment of the present invention includes the four permanent magnets 11 arranged along the inner peripheral surface of the cylindrical yoke 10 at predetermined intervals in the circumferential direction, the magnet cover 12 for covering the inner peripheral surface and both the circumferential side surfaces of each of the permanent magnets 11, the magnet cover 12 including the locking portions 12c on outer sides of both the side surfaces, and the magnet holder 13 made of a non-magnetic material, which is formed by coupling the annular portions 13b for covering both the axial side surfaces of each of the permanent magnets 11 and the columnar portions 13a provided between the adjacent permanent magnets 11, for retaining the permanent magnets 11 in the circumferential direction. The magnet holder 13 includes, on the outer diameter side of both the circumferential side surfaces of the columnar portion 13a, the engaging portions 13c which engage with the respective locking portions 12c of the magnet cover 12, and includes, on the inner diameter side of both the circumferential side surfaces of the columnar portion 13a, the extending portions 13d each extending toward the inner peripheral surface of the magnet cover 12 with the clearance D with respect to the inner peripheral surface of the magnet cover 12. With this configuration, even when deformation or dimensional variations of the magnet cover 12 occur, the deformed position of the magnet cover 12 or the part of the arc portion 12a of the magnet cover 12, which is close to the end surface portion 12b, comes into contact with the extending portion 13d, and thus the extending portion 13d plays a role as a stopper for suppressing the movement of the magnet cover 12 in the inner diameter direction. In this manner, the magnet cover 12 does not move in the inner diameter direction any further. Therefore, it is possible to provide a rotating electrical machine with further improved reliability, in which the magnet cover 12 does not come into contact with the rotor 20 and the magnet cover 12 does not fly toward the rotor 20. Note that, the clearance D is provided between the inner peripheral surface of the magnet cover 12 and the extending portion 13d. Therefore, in the case where a part of the arc portion 12a of the magnet cover 12 is slightly deformed, the magnet cover 12 does not come into contact with the extending portion 13d because the clearance D is provided, and the force that acts on the extending portion 13d can be reduced as compared to the case where the clearance D is absent.

Note that, according to the first embodiment of the present invention, it is only required to newly provide the extending portion 13d to the existing magnet holder 13, and hence the number of parts does not increase. Further, the extending portion 13d is provided to the columnar portion 13a of the magnet holder 13 made of a resin, and is provided in a wide range on the inner diameter side of each of both the circumferential side surfaces. Therefore, when the magnet holder 13 is formed by molding with a resin, the resin uniformly fills a region on the inner diameter side of each of both the circumferential side surfaces of the columnar portion 13a and between both the axial ends of the columnar portion 13a to form the extending portion 13d. Thus, the extending portion 13d can be easily formed.

Further, the corner portion 13e formed between the circumferential side surface and the extending portion 13d of the columnar portion 13a of the magnet holder 13 is formed into a round shape (curvature radius R1), and hence a root part of the extending portion 13a, that is, the part of the extending portion 13d, which is close to the corner portion 13e, may be formed to have a large thickness, and hence the strength of the extending portion 13d can be improved. Further, the corner portion 12d formed between the inner peripheral surface (arc portion 12a) and the circumferential side surface (end surface portion 12b) of the magnet cover 12 is formed into a round shape (curvature radius R2), and the corner portion 11a formed between the inner peripheral surface and the circumferential side surface of the permanent magnet 11 is formed into a round shape (curvature radius R3). In this case, the respective curvature radii R1, R2, and R3 are set to satisfy the relationship of R1<R2<R3. Therefore, gaps are generated between the corner portion 11a of the permanent magnet 11 and the corner portion 12d of the magnet cover 12 and between the corner portion 12d of the magnet cover 12 and the corner portion 13e of the magnet holder 13, and even when variations occur in the curvature radius R2 of the magnet cover 12, it is possible to absorb the variations of the curvature radius of the magnet cover 12.

Figure 8:
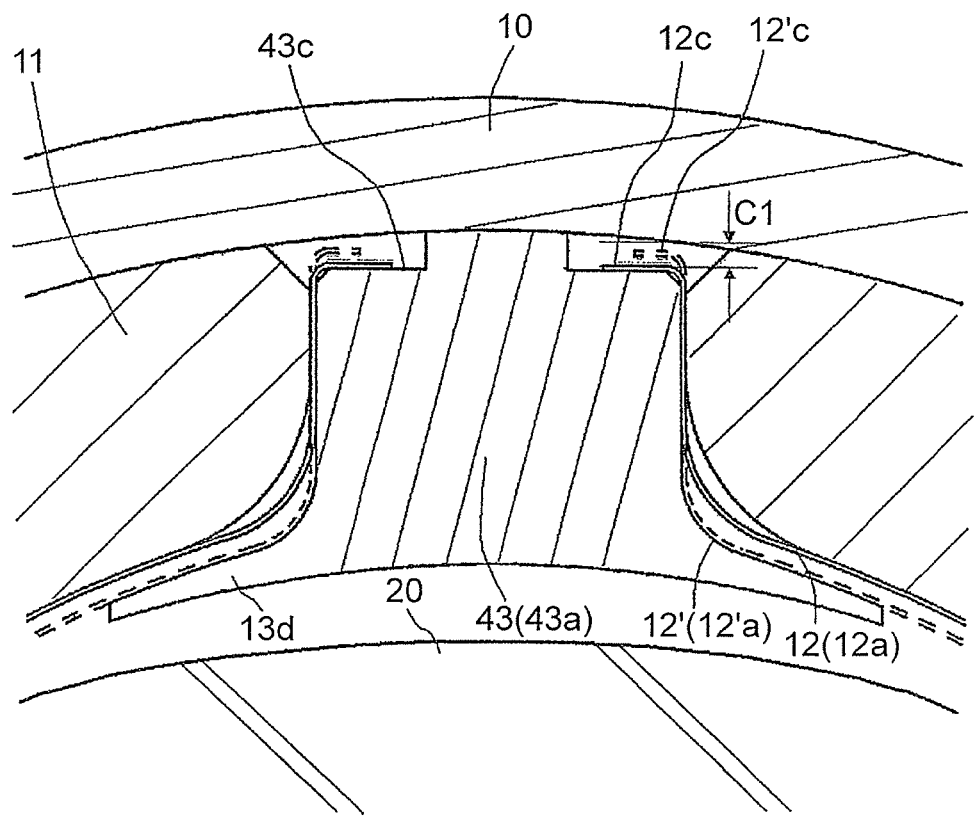
FIG. 8 An enlarged view of the vicinity of a columnar portion 43a of a magnet holder 43, which is a modified example of the magnet holder 13 illustrated in FIG. 1.

Further, in the rotating electrical machine according to the first embodiment of the present invention, as illustrated in FIG. 8, it is possible to increase the gap dimension so that a gap dimension C1 between an engaging portion 43c of a magnet holder 43 and the inner peripheral surface of the yoke 10 satisfies C1>C (see FIG. 5). Through increase of the gap dimension as described above, although a locking portion 12'c of a magnet cover 12' (see magnet cover 12 illustrated in FIG. 7 and the dotted lines of FIG. 8) comes into contact with the inner peripheral surface of the yoke 10, the locking portion 12c of the magnet cover 12 (see the solid line of FIG. 8) illustrated in FIG. 8 does not come into contact with the inner peripheral surface of the yoke 10. Therefore, a load from the yoke 10 is not applied, and with the gap dimension C1, it is possible to absorb the dimensional variations of the magnet cover 12.

Figure 9:
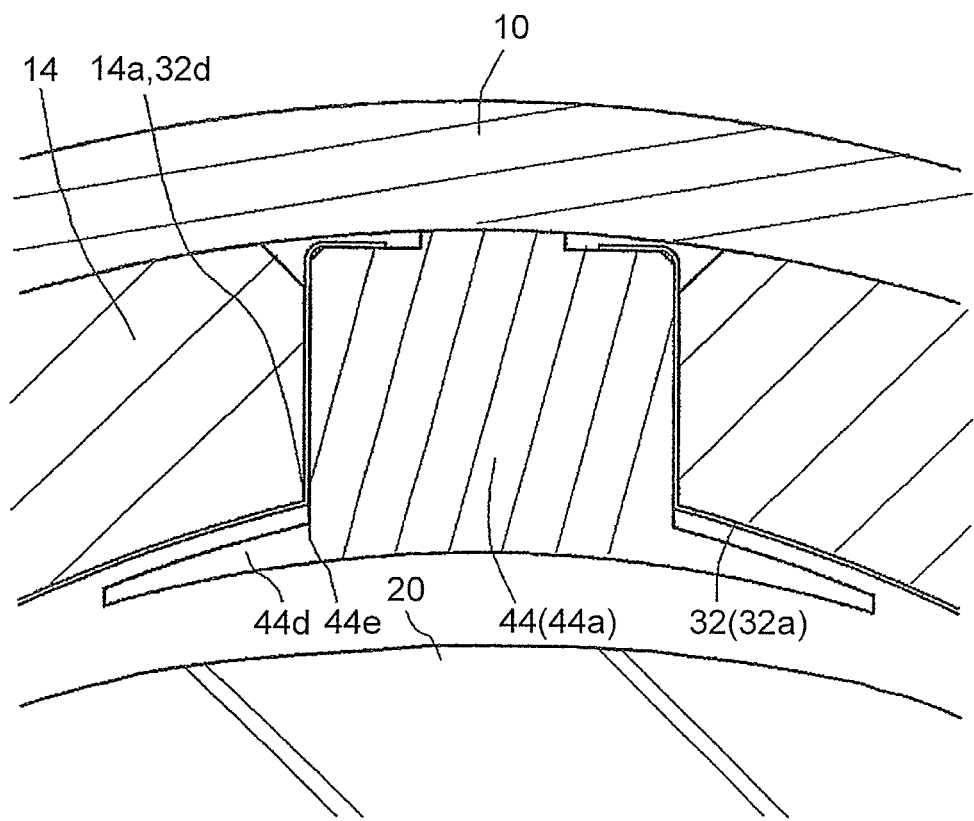
FIG. 9 An enlarged view of the vicinity of a columnar portion 44a of a magnet holder 44, which is another modified example of the magnet holder 13 illustrated in FIG. 1.

Further, in the rotating electrical machine according to the first embodiment of the present invention, description is made of the case where the corner portion 11a of the permanent magnet 11, the corner portion 12d of the magnet cover 12, and the corner portion 13e of the magnet holder 13 each have a round shape. However, the present invention is not limited to this case. For example, as illustrated in FIG. 9, a corner portion 14a of a permanent magnet 14, a corner portion 32d of a magnet cover 32, and a corner portion 44e of a magnet holder 44 may each have an angular shape. Also in the case where such corner portions 14a, 32d, and 44e are provided, even when deformation or dimensional variations of the magnet cover 32 occur, an extending portion 44d (first extending portion) plays a role as a stopper for restricting the movement of the magnet cover 32 in the inner diameter direction. Thus, it is possible to provide a rotating electrical machine with further improved reliability, in which the magnet cover 32 does not come into contact with the rotor 20 and the magnet cover 32 does not fly toward the rotor 20.

Figure 10A:
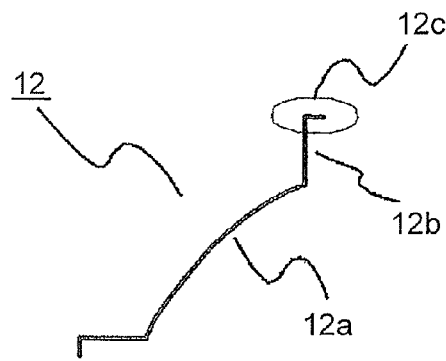
FIG. 10 Sectional views of the magnet cover 12 illustrated in FIG. 4 (FIG. 10(a)) and a magnet cover 33 which is a modified example of the magnet cover 12 (FIG. 10(b)), when the brushed motor 1 according to the first embodiment of the present invention is viewed in the axial direction.
Figure 10B:
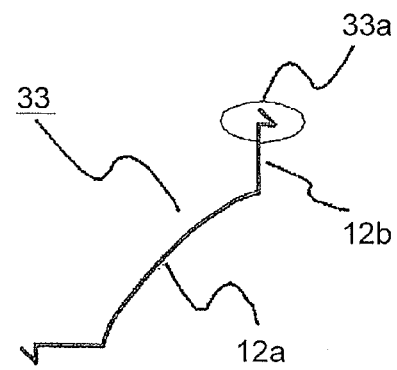

Note that, in the rotating electrical machine according to the first embodiment of the present invention, description is made of a case where the magnet cover 12 includes the locking portions 12c bent at both the end portions of the end surface portions 12b (see FIG. 10(a)), but the present invention is not limited to this case. The locking portions 12c are only required to be provided on the outer sides of both the circumferential side surfaces of the permanent magnet 11, and for example, even when locking portions 33a as illustrated in FIG. 10(b) are provided, the locking portions 33a of the magnet cover 33 can engage with the respective engaging portions 13c of the magnet holder 13. This engagement determines the fitting position of the magnet cover 12, and thus the magnet cover 12 does not move in the inner diameter direction any further. Therefore, the magnet cover 12 does not come into contact with the rotor 20, and it is possible to prevent the rotation failure of the rotor 20.

Figure 11:
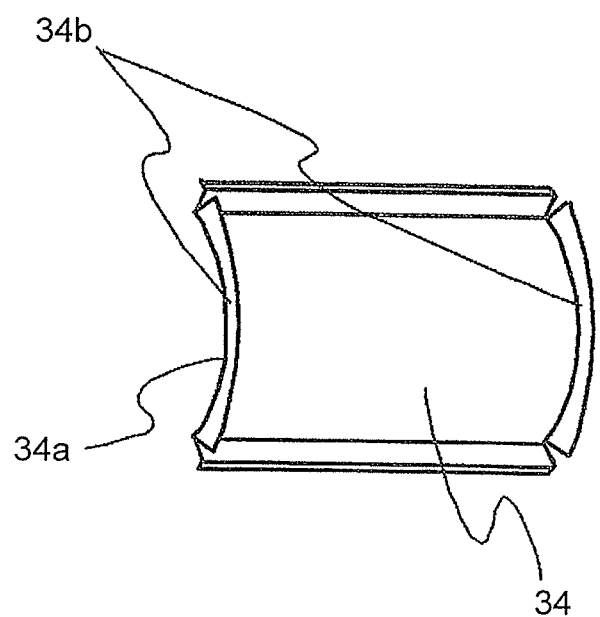
FIG. 11 A perspective view of a magnet cover 34 which is a modified example of the magnet cover 12 illustrated in FIG. 2.

Further, in the rotating electrical machine according to the first embodiment of the present invention, instead of the magnet cover 12, a magnet cover 34 illustrated in FIG. 11 may be fitted to the magnet holder 13. The magnet cover 34 illustrated in FIG. 11 includes end surface portions 34b bent in a direction parallel to the annular portion 13b of the magnet holder 13 at both axial ends of an arc portion 34a thereof, and thus the magnet cover 34 is formed into a box shape. With use of the magnet cover 34 instead of the magnet cover 12, the end surface portion 34b of the magnet cover 34 overlaps with a side surface of the annular portion 13b of the magnet holder 13, which covers the permanent magnet 11, without a gap. Therefore, even when the permanent magnet 11 is damaged, a fragment of the permanent magnet 11 does not fly toward the rotor 20, and it is possible to provide a rotating electrical machine with further improved reliability.

Figure 12:
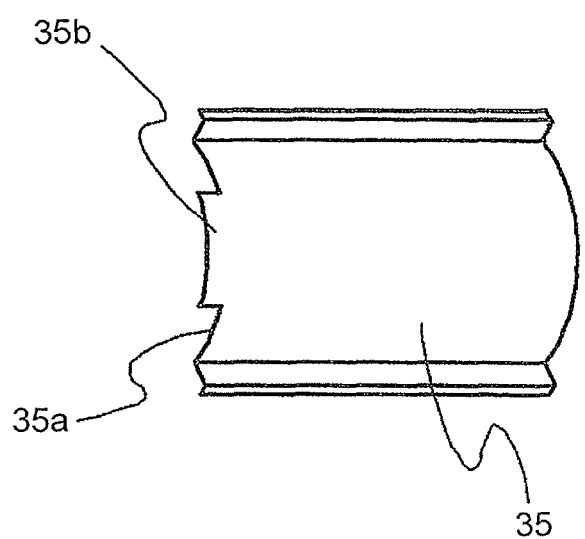
FIG. 12 A perspective view of a magnet cover 35 which is another modified example of the magnet cover 12 illustrated in FIG. 2.
Figure 13:
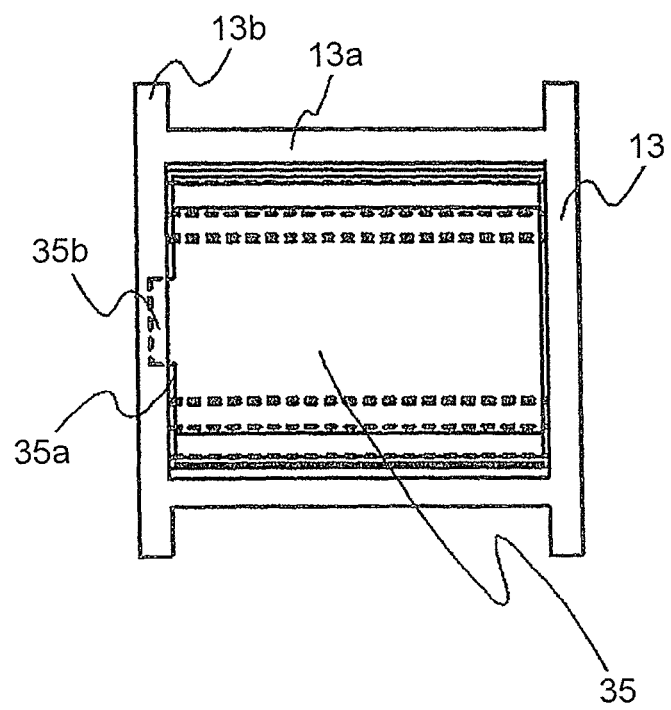
FIG. 13 A side view when the magnet cover 35 illustrated in FIG. 12 is fitted to the magnet holder 13.

Further, in the rotating electrical machine according to the first embodiment of the present invention, instead of the magnet cover 12, a magnet cover 35 illustrated in FIGS. 12 and 13 may be fitted to the magnet holder 13. In the magnet cover 35 illustrated in FIGS. 12 and 13, at a circumferential center portion of one side surface of an arc portion 35a thereof, there is provided a protruding portion 35b protruding in the axial direction. With use of the magnet cover 35 instead of the magnet cover 12, the protruding portion 35b of the magnet cover 35 overlaps with the inner peripheral surface of the annular portion 13b of the magnet holder 13, and the magnet cover 35 overlaps with the side surface of the annular portion 13b, which covers the permanent magnet 11, without a gap. Therefore, even when the permanent magnet 11 is damaged, the fragment of the permanent magnet 11 does not fly toward the rotor 20, and it is possible to provide a rotating electrical machine with further improved reliability.

Figure 14A:
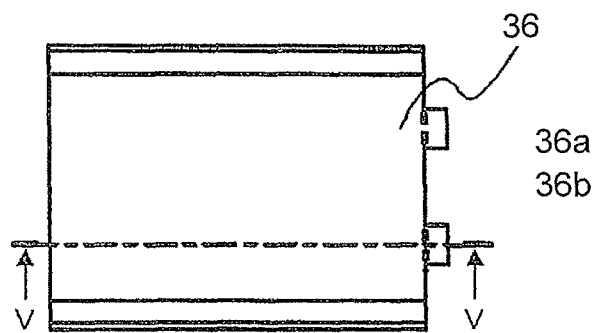
FIG. 14 A front view (FIG. 14(a)) of a magnet cover 36 which is a modified example of the magnet cover 12 illustrated in FIG. 4, and a sectional view (FIG. 14(b)) taken along the line V-V of FIG. 14(a).
Figure 14B:

Further, in the rotating electrical machine according to the first embodiment of the present invention, instead of the magnet cover 12, a magnet cover 36 illustrated in FIG. 14 may be fitted to the magnet holder 13. The magnet cover 36 illustrated in FIG. 14 includes a plate spring 36b on one side surface of an arc portion 36a thereof. With use of the magnet cover 36 instead of the magnet cover 12, when the magnet cover 36 is fitted to the magnet holder 13, due to the elastic change of the plate spring 36b of the magnet cover 36, the magnet cover 36 and the magnet holder 13 overlap with each other in the axial direction of the magnet cover 36 without a gap. Therefore, even when the permanent magnet 11 is damaged, the fragment of the permanent magnet 11 does not fly toward the rotor 20, and it is possible to provide a rotating electrical machine with further improved reliability.

Second Embodiment

Figure 15:
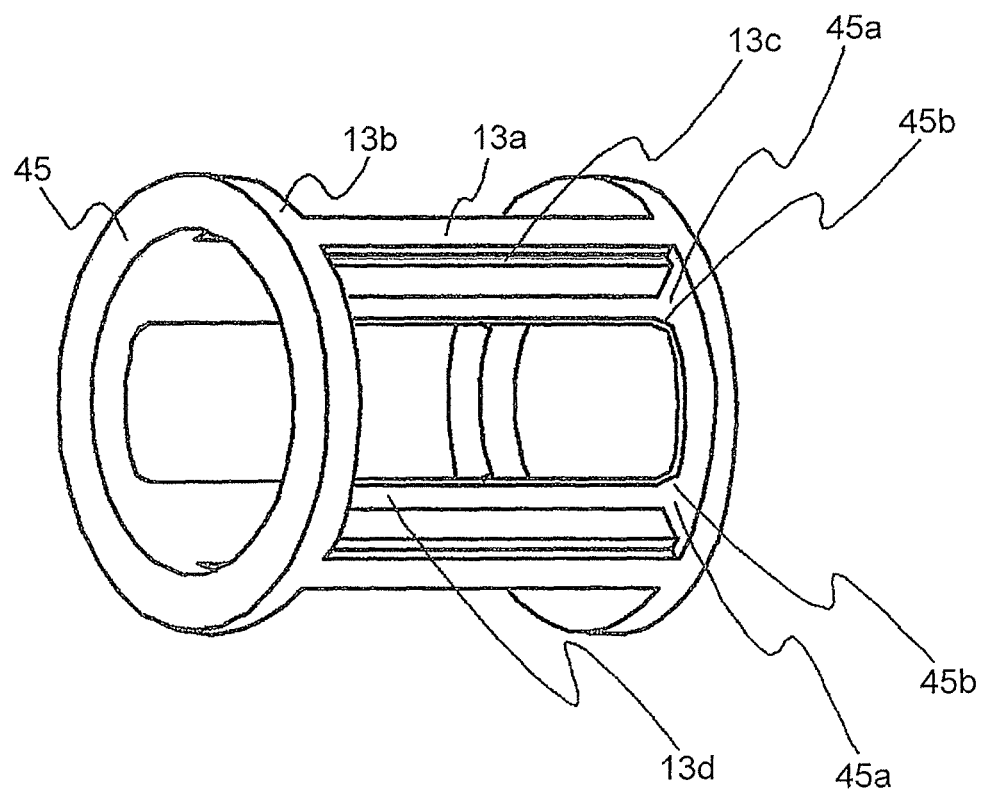
FIG. 15 A perspective view of a magnet holder 45 of a brushed motor according to a second embodiment of the present invention.
Figure 16:
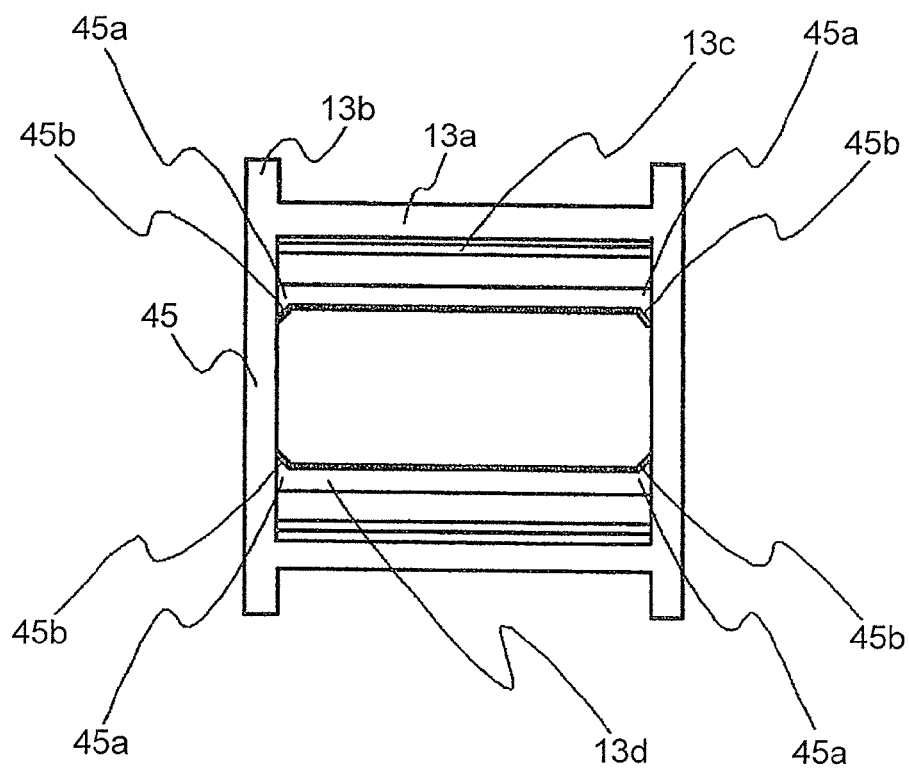
FIG. 16 A side view of the magnet holder 45 illustrated in FIG. 15.

In the above-mentioned first embodiment, description is made of a case where, in the rotating electrical machine which uses the permanent magnet, the first extending portion is provided on the inner diameter side of each of both the circumferential side surfaces of the columnar portion forming the magnet holder. In contrast, in a second embodiment of the present invention, a second extending portion is further provided in the first embodiment on the inner diameter side of a corner portion, which is formed by coupling the columnar portion and the annular portion forming the magnet holder. This case is described with reference to FIGS. 15 and 16. FIG. 15 is a perspective view of a magnet holder 45 forming a brushed motor according to the second embodiment of the present invention. FIG. 16 is a side view of the magnet holder 45 illustrated in FIG. 15 as viewed from a direction (radial direction) in which the permanent magnet 11 and the magnet cover 12 are inserted. Note that, in the brushed motor according to the second embodiment of the present invention, components other than the magnet holder 45 illustrated in FIG. 15 are the same as those of the brushed motor 1 illustrated in FIG. 1, and hence detailed description thereof is omitted.

In FIGS. 15 and 16, on the inner diameter side of four corner portions 45a formed by coupling the columnar portions 13a and the annular portions 13b of the magnet holder 45, there are respectively provided extending portions 45b (second extending portion) each extending toward the inner peripheral surface of the magnet cover 12. In this case, as described in the first embodiment, the magnet cover 12 is inserted into a space formed by the columnar portions 13a and the annular portions 13b of the magnet holder 13. Therefore, in design, the axial length of the magnet cover 12 is generally set to be slightly smaller than the axial length of the columnar portion 13a of the magnet holder 13. Then, when the magnet cover 12 is fitted to the magnet holder 13, a gap is generated between the magnet cover 12 and the magnet holder 13 in the fitting direction of the magnet cover 12. Therefore, there has been a risk that, for example, when the permanent magnet 11 is damaged, the fragment of the permanent magnet 11 flies toward the rotor 20 through the gap. However, in the second embodiment of the present invention, the extending portions 45b are respectively provided on the inner diameter side of the four corner portions 45a formed by coupling the columnar portions 13a and the annular portions 13b of the magnet holder 45, and hence each of the extending portions 45b of the magnet holder 45 overlaps with the corner portion 12d formed between the arc portion 12a and the end surface portion 12b of the magnet cover 12 (see FIG. 1) in the vicinity of each axial end of the corner portion 12d without a gap. Therefore, even when the permanent magnet 11 is damaged, the fragment of the permanent magnet 11 does not fly toward the rotor 20, and it is possible to provide a rotating electrical machine with further improved reliability.

As described above, in the rotating electrical machine according to the second embodiment of the present invention, on the inner diameter side of the corner portion 45a formed by coupling the columnar portion 13a and the annular portion 13b of the magnet holder 45, the extending portion 45b extending toward the inner peripheral surface of the magnet cover 12 is provided. With this configuration, the extending portion 45b of the magnet holder 45 overlaps with the corner portion 12d of the magnet cover 12 in the vicinity of each axial end of the corner portion 12d without a gap. Therefore, even when the permanent magnet 11 is damaged, the fragment of the permanent magnet 11 does not fly toward the rotor 20, and it is possible to provide a rotating electrical machine with further improved reliability.

Note that, according to the second embodiment of the present invention, it is only required to newly provide the extending portions 13d and 45b to the magnet holder 45, and hence similarly to the first embodiment of the present invention, the number of parts does not increase. Further, the extending portion 45b is provided on the inner diameter side of the corner portion 45a formed between the columnar portion 13a and the annular portion 13b of the magnet holder 45 made of a resin, and provided on the same curved surface as the extending portion 13d provided on the inner diameter side of each of both the circumferential side surfaces of the columnar portion 13a. Therefore, the range including the extending portions 13d and 45b can be formed with one mold. Accordingly, when the magnet holder 45 is formed by molding with a resin, the range to be filled with the resin becomes wider as compared to the case described in the first embodiment of the present invention, in which the magnet holder 13 is formed by molding with a resin, to a range including the extending portions 13d and 45b. The resin uniformly fills a portion on the inner diameter side of the corner portion 45a at which the extending portion 45b is formed as well, and thus the extending portions 13d and 45b are formed. In this manner, the extending portions 13d and 45b can be easily formed.

Further, in the rotating electrical machine according to the second embodiment of the present invention, description is made of a case where the extending portions 45b are provided to all of the four corner portions 45a, but the present invention is not limited to this case. The extending portion 45b may be provided to at least one corner portion 45a. In this case, a portion of the magnet holder 45 at which the extending portion 45b is provided with respect to a surface to which the permanent magnet 11 is inserted in a space formed by the columnar portions 13a and the annular portions 13b of the magnet holder 13 overlaps, without a gap, with a portion of the corner portion 12d of the magnet cover 12 which is in the vicinity of each axial end of the corner portion 12d and to be inserted with respect to the extending portion 45b. Therefore, when the permanent magnet 11 is damaged and the fragment thereof flies toward the vicinity of the portion at which the extending portion 45b is provided, it is possible to prevent the fragment of the permanent magnet 11 from flying toward the rotor 20.

Further, in the rotating electrical machine according to the second embodiment of the present invention, description is made of a case where the extending portion 45b axially extending toward the inner peripheral surface of the magnet cover 12 is provided, and no description is made of presence and absence of a clearance between the extending portion 45b and the inner peripheral surface of the magnet cover 12. The clearance may be provided, or the extending portion 45b may be brought into contact with the inner peripheral surface of the magnet cover 12. When the extending portion 45b is brought into contact with the inner peripheral surface of the magnet cover 12, in addition to the engagement between the engaging portion 13c of the magnet holder 45 and the locking portion 12c of the magnet cover 12, the extending portion 45b provided to the magnet holder 45 can be used to retain the magnet cover 12, and hence the retaining force of the magnet holder 45 is improved.

Further, in the second embodiment of the present invention, similarly to the description in the first embodiment, instead of the magnet cover 12, any one of the magnet cover 34 illustrated in FIG. 11, the magnet cover 35 illustrated in FIG. 12, and the magnet cover 36 illustrated in FIG. 14 may be fitted to the magnet holder 13. When any one of the magnet covers 34 to 36 is used instead of the magnet cover 12, a part of each magnet cover (34, 35, or 36) and a part of the magnet holder 13 overlap with each other without a gap. Therefore, even when the permanent magnet 11 is damaged, the fragment of the permanent magnet 11 does not fly toward the rotor 20 through the overlapped part, and it is possible to provide a rotating electrical machine with further improved reliability.

Third Embodiment

Figure 17:
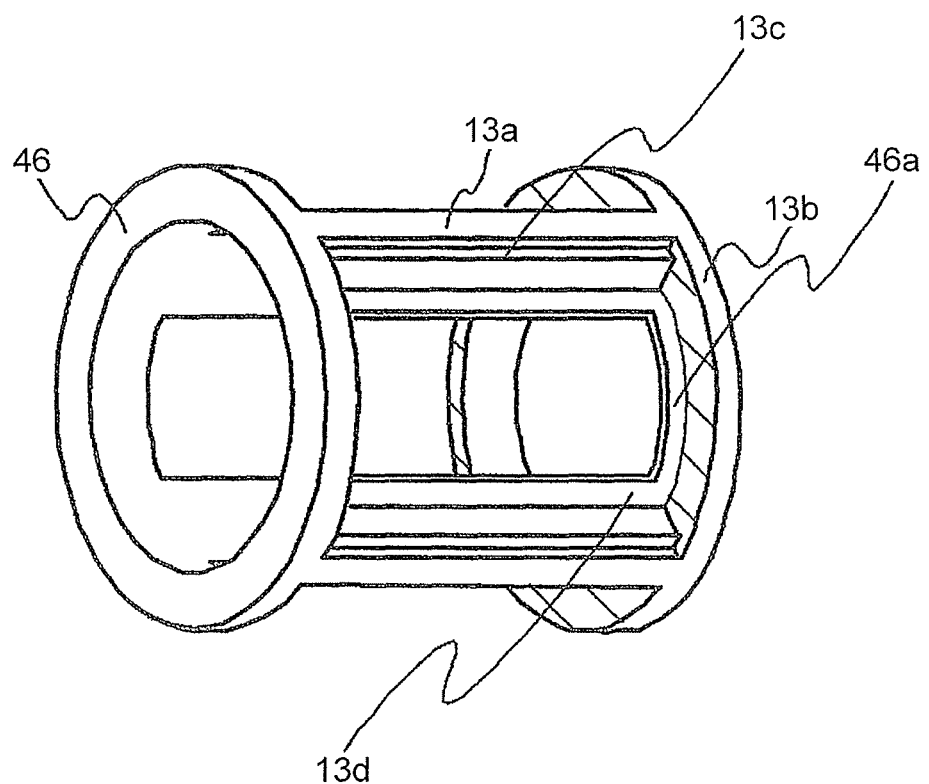
FIG. 17 A perspective view of a magnet holder 46 of a brushed motor according to a third embodiment of the present invention.
Figure 18:
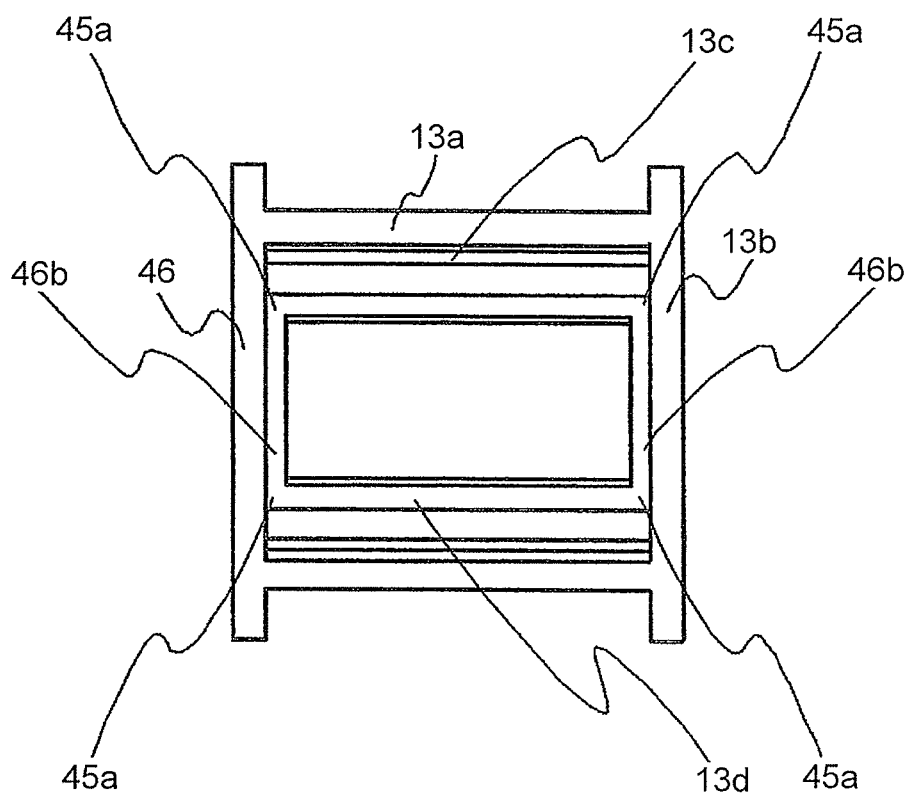
FIG. 18 A side view of the magnet holder 46 illustrated in FIG. 17.

In the above-mentioned second embodiment, description is made of a case where, in the rotating electrical machine which uses the permanent magnet, the first extending portion is provided on the inner diameter side of each of both the circumferential side surfaces of the columnar portion forming the magnet holder, and the second extending portion is further provided on the inner diameter side of the corner portion formed by coupling the columnar portion and the annular portion forming the magnet holder. In contrast, in a third embodiment of the present invention, description is made with reference to FIGS. 17 and 18 of a case where, in the first embodiment, on an inner diameter side of a side surface of the annular portion, which covers the permanent magnet, there is further provided a third extending portion axially extending toward the inner peripheral surface of the magnet cover. FIG. 17 is a perspective view of a magnet holder 46 forming a brushed motor according to the third embodiment of the present invention. FIG. 18 is a side view of the magnet holder 46 illustrated in FIG. 17 as viewed from a direction (radial direction) in which the permanent magnet 11 and the magnet cover 12 are inserted. Note that, in the brushed motor according to the third embodiment of the present invention, components other than the magnet holder 46 illustrated in FIG. 17 are the same as those of the brushed motor 1 illustrated in FIG. 1, and hence detailed description thereof is omitted.

In FIGS. 17 and 18, on the inner diameter side of each of two side surfaces of the respective annular portions 13b of the magnet holder 46, which cover the permanent magnet 11 (for example, a shaded part in FIG. 17, the same applies to the other annular portion), there is provided an extending portion 46b (third extending portion) axially extending toward the inner peripheral surface of the magnet cover 12. In this case, as described in the second embodiment, when the extending portions 45b are provided on the inner diameter side of the four corner portions 45a formed by coupling the columnar portions 13a and the annular portions 13b of the magnet holder 45, the extending portions 45b overlap with the corner portions 12d of the magnet cover 12 in the vicinity of both the axial ends of the corner portions 12d. Therefore, the overlapping part can prevent the fragment of the permanent magnet 11 from flying toward the rotor 20. However, the extending portion 45b does not overlap with portions of the magnet cover 12 other than the vicinity of both the axial ends of the corner portions 12d, and, for example, at a circumferential center portion of the annular portion 13b, a gap is generated between the magnet cover 12 and the magnet holder 45. Therefore, when the permanent magnet 11 is damaged, the fragment of the permanent magnet 11 flies toward the rotor 20 through the gap in some cases. In contrast, in the third embodiment of the present invention, on the inner diameter side of the side surface of the annular portion 13b of the magnet holder 46, which covers the permanent magnet 11, the extending portion 46b is provided, and thus the extending portion 46b of the magnet holder 46 overlaps with the arc portion 12a of the magnet cover 12 at each axial end of the arc portion 12a without a gap. Therefore, even when the permanent magnet 11 is damaged, the fragment of the permanent magnet 11 does not fly toward the rotor 20, and it is possible to provide a rotating electrical machine with further improved reliability.

As described above, in the rotating electrical machine according to the third embodiment of the present invention, on the inner diameter side of each of the two side surfaces of the respective annular portions 13b, which cover the permanent magnet 11, the extending portion 46b is provided. With this configuration, the extending portion 46b of the magnet holder 46 overlaps with the arc portion 12a of the magnet cover 12 at each axial end of the arc portion 12a without a gap. As a result, even when the permanent magnet 11 is damaged, the fragment of the permanent magnet 11 does not fly toward the rotor 20, and it is possible to provide a rotating electrical machine with further improved reliability. Note that, according to the third embodiment of the present invention, it is only required to newly provide the extending portions 13d and 46b to the magnet holder 46, and hence similarly to the first embodiment of the present invention, the number of parts does not increase.

Figure 19:
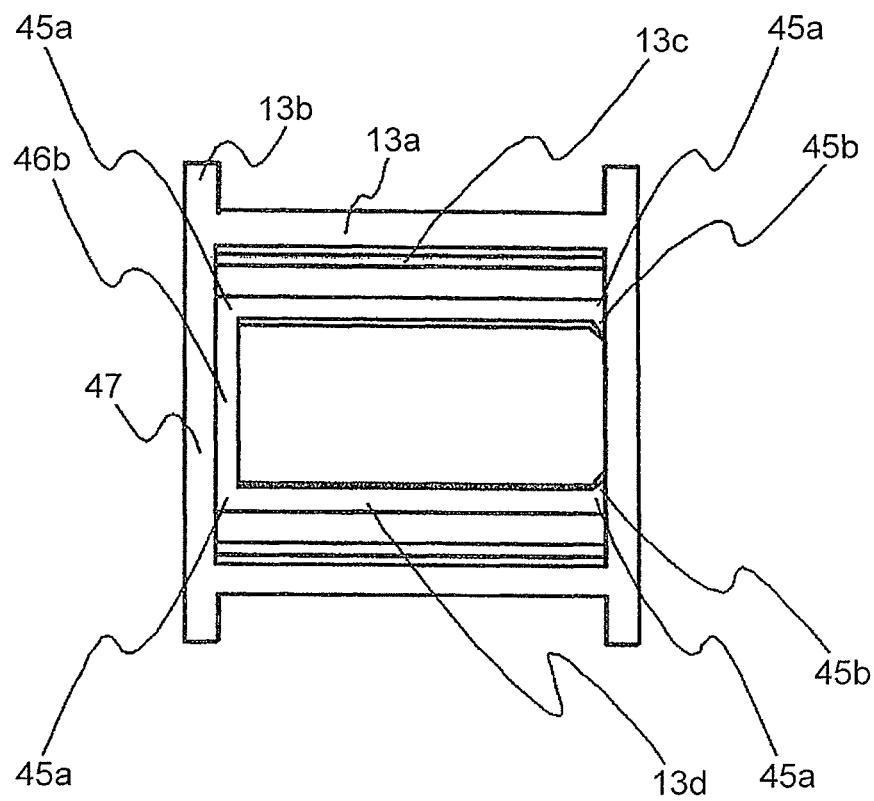
FIG. 19 A view illustrating a modified example of the magnet holder 46 illustrated in FIG. 17.

Note that, in the rotating electrical machine according to the third embodiment of the present invention, description is made of a case where, on the inner diameter side of each of the two side surfaces of the respective annular portions 13b, which cover the permanent magnet 11, the extending portion 46b is provided. However, the present invention is not limited to this case, and the extending portion 46b may be provided on the inner diameter side of any one of the side surfaces. Alternatively, as illustrated in FIG. 19, on the inner diameter side of one side surface of the annular portion 13b, the extending portion 46b described in the third embodiment of the present invention may be provided, and regarding the other side surface, as described in the second embodiment of the present invention, on the inner diameter side of the corner portions 45a formed between the columnar portions 13a and the annular portion 13b, the extending portions 45b (second extending portion) may be provided. As described above, when the extending portions 45b and 46b are provided to a magnet holder 47, the portions (45b and 46b) of the magnet holder 47 at which the extending portions are provided overlap with the corner portions 12d or the arc portion 12a of the magnet cover 12 at both axial ends thereof without a gap. Therefore, even when the permanent magnet 11 is damaged, in a case where the fragment of the permanent magnet 11 flies toward the vicinity of the portion at which the extending portion is provided, it is possible to prevent the fragment of the permanent magnet 11 from flying toward the rotor 20.

Further, in the rotating electrical machine according to the third embodiment of the present invention, description is made of a case where the extending portion 46b axially extending toward the inner peripheral surface of the magnet cover 12 is provided, and no description is made of presence and absence of a clearance between the extending portion 46b and the inner peripheral surface of the magnet cover 12. The clearance may be provided, or the extending portion 46b may be brought into contact with the inner peripheral surface of the magnet cover 12. When the extending portion 46b is brought into contact with the inner peripheral surface of the magnet cover 12, in addition to the engagement between the engaging portion 13c of the magnet holder 46 and the locking portion 12c of the magnet cover 12, the extending portion 46b provided to the magnet holder 46 can be used to retain the magnet cover 12, and hence the retaining force of the magnet holder 46 is improved.

Further, in the third embodiment of the present invention, similarly to the description in the first embodiment, instead of the magnet cover 12, any one of the magnet cover 34 illustrated in FIG. 11, the magnet cover 35 illustrated in FIG. 12, and the magnet cover 36 illustrated in FIG. 14 may be fitted to the magnet holder 13. When any one of the magnet covers 34 to 36 is used instead of the magnet cover 12, a part of each magnet cover (34, 35, or 36) and a part of the magnet holder 13 overlap with each other without a gap. Therefore, even when the permanent magnet 11 is damaged, the fragment of the permanent magnet 11 does not fly toward the rotor 20 through the overlapped part, and it is possible to provide a rotating electrical machine with further improved reliability.

Fourth Embodiment

Figure 20:
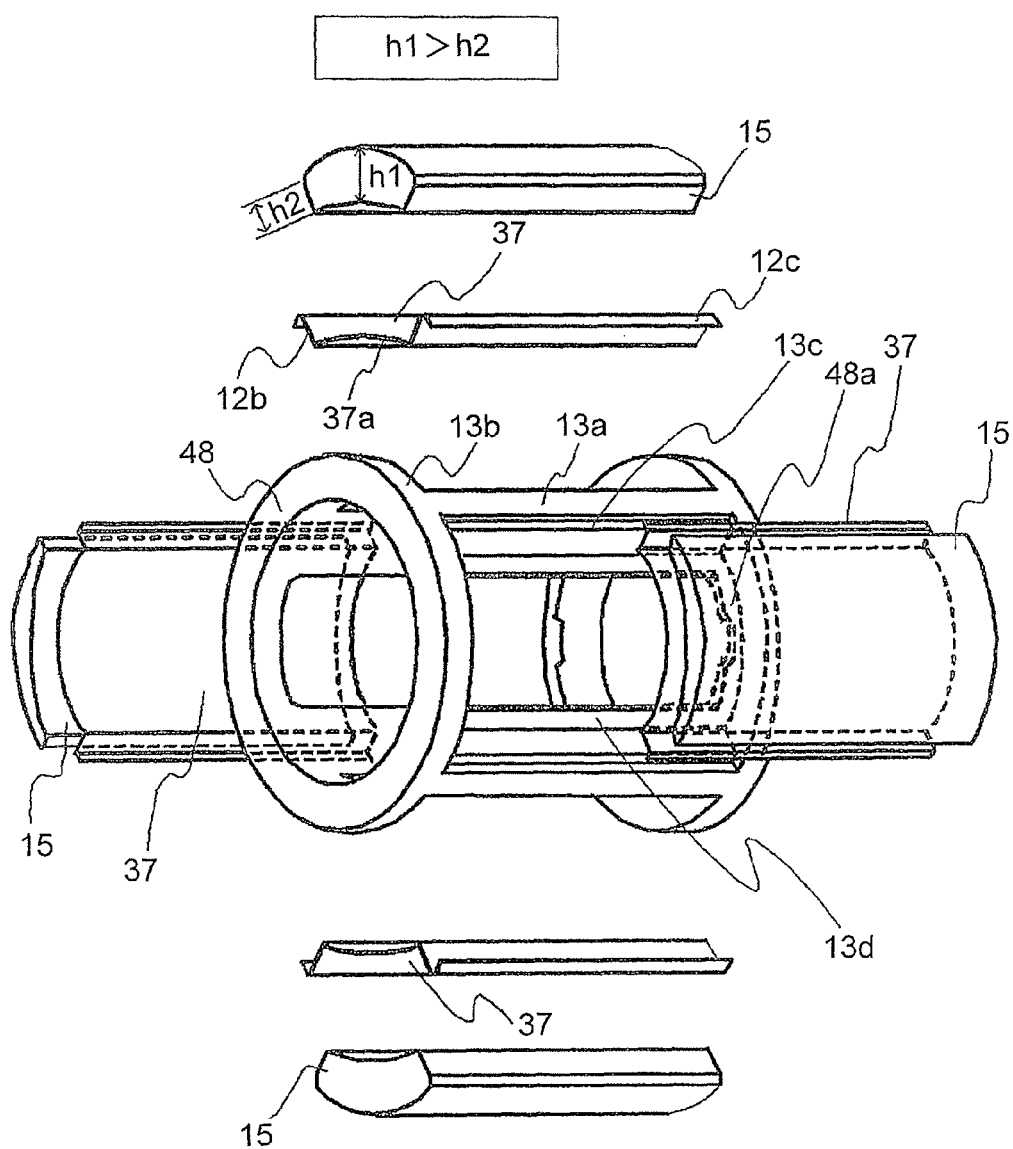
FIG. 20 A configuration view illustrating assembly of permanent magnets 15 of a brushed motor according to a fourth embodiment of the present invention.
Figure 21:
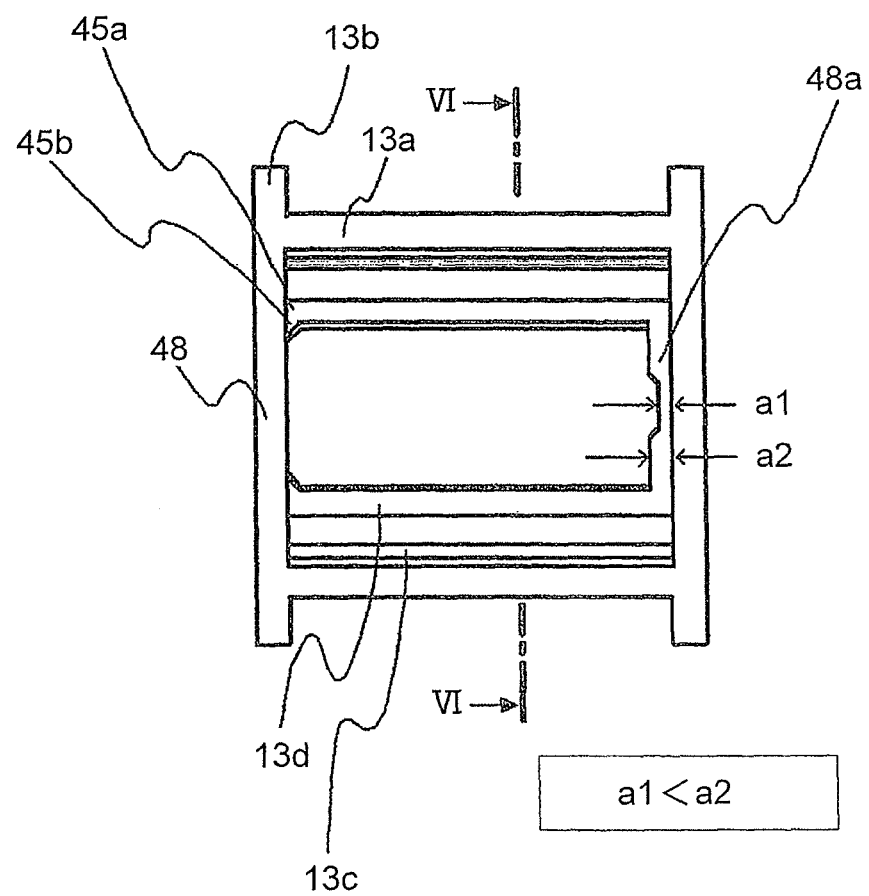
FIG. 21 A side view of a magnet holder 48 illustrated in FIG. 20.
Figure 22:
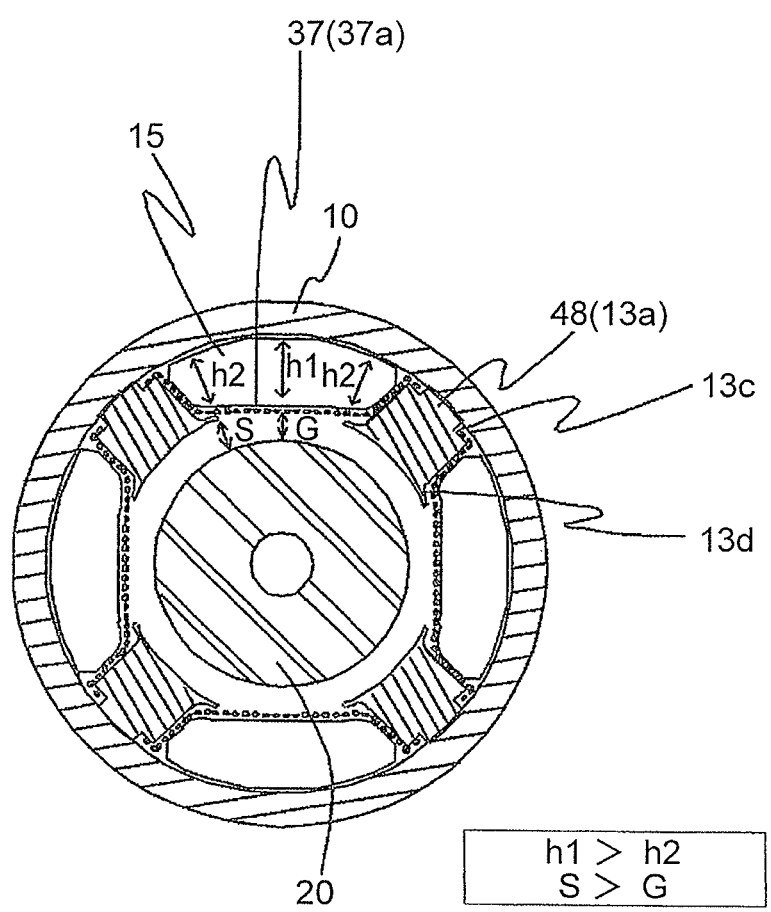
FIG. 22 A sectional view taken along the line VI-VI of FIG. 21.
Figure 23:
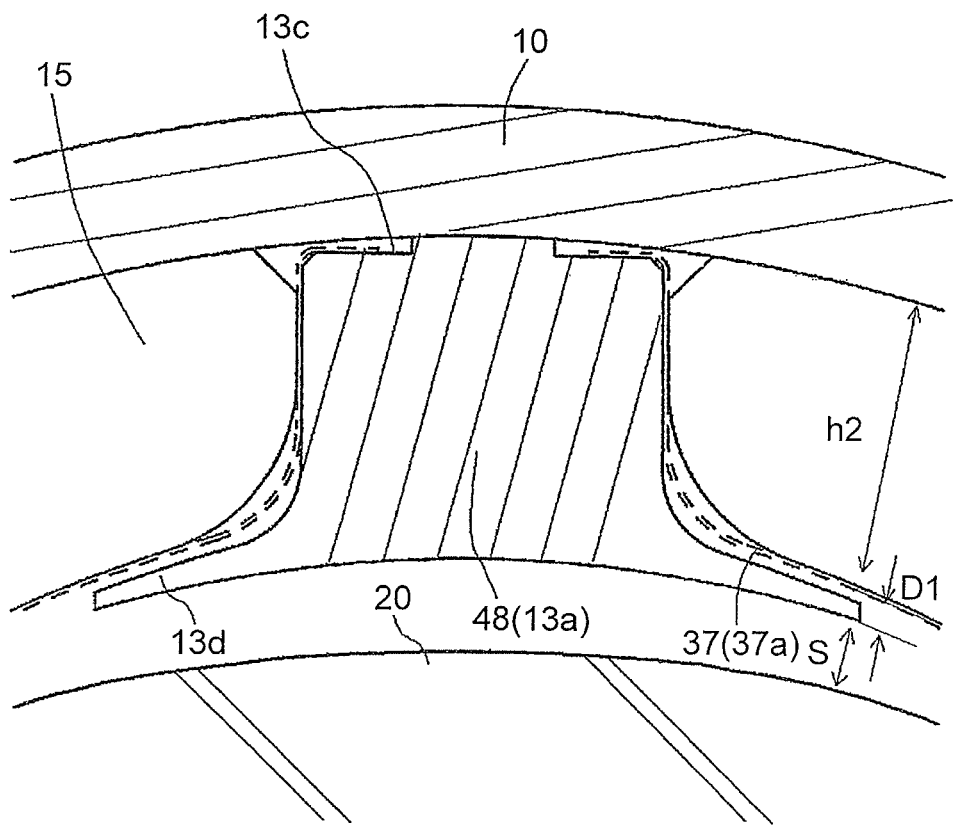
FIG. 23 An enlarged view of the vicinity of a columnar portion 13a of the magnet holder 48 illustrated in FIG. 21.

In the rotating electrical machine according to each of the above-mentioned first to third embodiments, the permanent magnets are only required to be arranged along the inner peripheral surface of the yoke at predetermined intervals in the circumferential direction, and the shape of the permanent magnet has not been referred to. In contrast, in a fourth embodiment of the present invention, description is made with reference to FIGS. 20 to 23 of a case where, in the first to third embodiments, the radial thickness of the permanent magnet is larger at a circumferential center portion thereof than at both the circumferential end portions thereof. FIG. 20 is a configuration view illustrating assembly of permanent magnets 15 forming a brushed motor according to the fourth embodiment of the present invention. FIG. 21 is a side view of a magnet holder 48 illustrated in FIG. 20 as viewed from a direction (radial direction) in which the permanent magnet 15 and the magnet cover 12 are inserted. FIG. 22 is a sectional view taken along the line VI-VI of FIG. 21, and a magnet cover 37 when the magnet cover 37 is fitted to the magnet holder 48 is illustrated by a dotted line. Further, FIG. 23 is an enlarged view of the vicinity of the columnar portion 13a of the magnet holder 48 illustrated in FIG. 22. Note that, in the brushed motor according to the fourth embodiment of the present invention, components other than the permanent magnet 15, the magnet cover 37, and the magnet holder 48 illustrated in FIG. 20 are the same as those in the brushed motor 1 illustrated in FIG. 1, and hence detailed description thereof is omitted.

The permanent magnet 15 is a permanent magnet similar to that described in the above-mentioned first embodiment and is made of a ceramic-based material such as ferrite. As illustrated in FIG. 20, the magnet holder 48 has a vertical sectional shape as viewed from the axial direction, in which a thickness $h_1$ of the circumferential center portion is larger than a thickness $h_2$ of both the circumferential end portions ($h_1 > h_2$).

In FIGS. 20 and 21, on the inner diameter side of one of side surfaces of the respective annular portions 13b of the magnet holder 48, which cover the permanent magnet 15, there is provided an extending portion 48a (third extending portion) axially extending toward the inner peripheral surface of the magnet cover 37. Regarding the other side surface, as described in the second embodiment of the present invention, two corner portions 45a are formed by coupling the columnar portions 13a and the annular portion 13b of the magnet holder 48, and on the inner diameter side of the corner portions 45a, there are provided extending portions 45b (second extending portion) extending toward the inner peripheral surface of the magnet cover 12. The length of the extending portion 48a extending in the axial direction is not constant in the circumferential direction, and as illustrated in FIG. 21, a length $a_1$ of the circumferential center portion is smaller than a length $a_2$ of both the circumferential end portions ($a_1 < a_2$). In this case, as described in the third embodiment, the extending portion 48a is provided on the inner diameter side of one of the side surfaces of the respective annular portions 13b, which cover the permanent magnet 15, and thus the extending portion 48a of the magnet holder 48 overlaps, without a gap, with an axial end of an arc portion 37a of the magnet cover 37 on a side at which the extending portion 48a is provided. Therefore, even when the permanent magnet 15 is damaged, the fragment of the permanent magnet 15 does not fly toward the rotor 20, and it is possible to provide a rotating electrical machine with further improved reliability. In this case, each circumferential end portion of the extending portion 48a is formed continuously with the extending portion 13d provided to the columnar portion 13a, and hence deformation with respect to a force in the radial direction is small (rigidity is large). However, the circumferential center portion of the extending portion 48a has a smaller rigidity than both the circumferential end portions described above, and hence when the length of the extending portion 48a extending in the axial direction is constant in the circumferential direction, there is a risk that the circumferential center portion of the extending portion 48a may be deformed or damaged. However, in the fourth embodiment of the present invention, regarding the length of the extending portion 48a extending in the axial direction, the length $a_1$ of the circumferential center portion is set smaller than the length $a_2$ of both the circumferential end portions. Thus, the rigidity of the circumferential center portion of the extending portion 48a increases, and therefore the circumferential center portion of the extending portion 48a is not deformed and it is possible to provide a rotating electrical machine with further improved reliability.

Further, as illustrated in FIG. 22, the magnet cover 37 is fitted to the magnet holder 48. At this time, an air gap G is provided between the circumferential center portion of the inner peripheral surface of the magnet cover 37 and the rotor 20, and a gap S is provided between a distal end portion of the inner peripheral surface of the extending portion 13d and the rotor 20. The gap S has a dimension larger than that of the air gap G (S>G). Further, the permanent magnet 15 is inserted so that the arc portion 37a of the magnet cover 37 covers the inner peripheral surface of the permanent magnet 15, in addition, so that the end surface portions 12b of the magnet cover 37 cover both the circumferential side surfaces of the permanent magnet 15. As a result, positional relationships as illustrated in FIG. 22 are obtained. In this case, the air gap G is set depending on characteristics necessary for the rotating electrical machine, and is set by providing a clearance so that the magnet cover 37 covering the permanent magnet 15 does not come into contact with the rotor 20. Therefore, it is necessary to set the gap S between the distal end portion of the inner peripheral surface of the extending portion 13d and the rotor 20 to be larger than the air gap G. Therefore, S>G is satisfied, and S is set as G+α. Further, both of the yoke 10 and the rotor 20 are concentrically formed. Therefore, the length from the yoke 10 to the rotor 20 is constant at both of the circumferential center portion and each circumferential end portion of the permanent magnet 15. When a distance obtained by adding the radial thickness of the extending portion 13d and the clearance between the extending portion 13d and the inner peripheral surface of the magnet cover 37 is represented by D1 (see FIG. 23), and the gap between the inner peripheral surface of the yoke 10 and the outer peripheral surface of the permanent magnet 15 and the gap between the inner peripheral surface of the permanent magnet 15 and the outer peripheral surface of the magnet cover 37 are not considered, the length from the yoke 10 to the rotor 20 is represented by G+h1 at the circumferential center portion of the permanent magnet 15, and is represented by S+D1+h2 at both the circumferential end portions thereof. In this case, as described above, the permanent magnet 15 has a vertical sectional shape as viewed from the axial direction, in which the thickness h1 of the circumferential center portion is larger than the thickness h2 of both the circumferential end portions. When h1 is set as h2+β, the length from the yoke 10 to the rotor 20 is represented by G+(h2+β)=(G+α)+D1+h2, which may be represented by β=α+D1 when being arranged. This expression represents that, regarding the radial thickness of the permanent magnet 15, the thickness h2 of both the circumferential end portions is formed so as to be smaller by β than the thickness h1 of the circumferential center portion, and this reduced thickness is equal to a distance obtained by adding the thickness of the extending portion 13d, the clearance D1 between the extending portion 13d and the inner peripheral surface of the magnet cover 37, and the clearance between the extending portion 13d and the rotor 20. With this configuration, it is possible to provide a rotating electrical machine capable of effectively securing the strength of the extending portion 13d provided to the magnet holder 48 while securing the air gap G including the clearance between the magnet cover 37 and the rotor 20.

As described above, in the rotating electrical machine according to the fourth embodiment of the present invention, an extending portion 48b is provided on the inner diameter side of each of the two side surfaces of the respective annular portion 13b, which cover the permanent magnet 11, and the length of the extending portion 48b extending in the axial direction is set so that the length a1 of the circumferential center portion is smaller than the length a2 of both the circumferential end portions. Thus, the rigidity of the circumferential center portion of the extending portion 48b increases, and hence the circumferential center portion of the extending portion 48a is not deformed and it is possible to provide a rotating electrical machine with further improved reliability. Note that, according to the fourth embodiment of the present invention, it is only required to newly provide the extending portions 13d, 45b, and 48b to the magnet holder 48, and hence similarly to the first embodiment of the present invention, the number of parts does not increase.

Further, in the rotating electrical machine according to the fourth embodiment of the present invention, regarding the radial thickness of the permanent magnet 15, the thickness of the h1 of the circumferential center portion is set larger than the thickness h2 of both the circumferential end portions, and in addition, the gap S between the distal end portion of the inner peripheral surface of the extending portion 13d and the rotor 20 has a dimension larger than that of the air gap G between the circumferential center portion of the inner peripheral surface of the magnet cover 37 and the rotor 20. Therefore, it is possible to provide a rotating electrical machine capable of effectively securing the strength of the extending portion 13d provided to the magnet holder 48 while securing the air gap G including the clearance between the magnet cover 37 and the rotor 20.

Further, in the rotating electrical machine according to the fourth embodiment of the present invention, description is made of a case where the extending portion 46b axially extending toward the inner peripheral surface of the magnet cover 37 is provided, and no description is made of presence and absence of a clearance between the extending portions 45b and 46b and the inner peripheral surface of the magnet cover 37. The clearance may be provided, or the extending portions 45b and 46b may be brought into contact with the inner peripheral surface of the magnet cover 37. When the extending portions 45b and 46b is brought into contact with the inner peripheral surface of the magnet cover 37, in addition to the engagement between the engaging portion 13c of the magnet holder 48 and the locking portion 12c of the magnet cover 37, the extending portions 45b and 46b provided to the magnet holder 48 can be used to retain the magnet cover 37, and hence the retaining force of the magnet holder 48 is improved.

Further, in the fourth embodiment of the present invention, similarly to the description in the first embodiment, instead of the magnet cover 37, any one of the magnet cover 34 illustrated in FIG. 11, the magnet cover 35 illustrated in FIG. 12, and the magnet cover 36 illustrated in FIG. 14 may be fitted to the magnet holder 13. When any one of the magnet covers 34 to 36 is used instead of the magnet cover 12, a part of each magnet cover (34, 35, or 36) and a part of the magnet holder 13 overlap with each other without a gap. Therefore, even when the permanent magnet 11 is damaged, the fragment of the permanent magnet 11 does not fly toward the rotor 20 through the overlapped part, and it is possible to provide a rotating electrical machine with further improved reliability.

REFERENCE SIGNS LIST 1 brushed motor (rotating electrical machine), 10 yoke, 10a, 30a bearing case portion, 11, 14, 15 permanent magnet, 11a, 12d, 13e, 14a, 32d, 44e, 45a corner portion, 12, 32, 33, 34, 35, 37 magnet cover, 12a, 12'a, 32a, 34a, 35a, 36a, 37a arc portion, 12b, 12'b, 34b end surface portion, 12c, 12'c, 33a locking portion, 13, 43, 44, 45, 46, 47, 48 magnet holder, 13a, 43a, 44a columnar portion, 13b annular portion, 13c, 43c engaging portion, 13d, 44d extending portion (first extending portion), 13f corner portion (chamfered portion), 20 rotor (armature), 21 commutator, 22 shaft, 23 rear bearing, 24 front bearing, 30 housing, 35b protruding portion, 36b: plate spring, 45b extending portion (second extending portion), 46b, 48a extending portion (third extending portion), C, C1 gap dimension, D, D1 clearance, G air gap, R1 curvature radius of corner portion 13e, R2 curvature radius of corner portion 12d, R3 curvature radius of corner portion 11a, S gap.

The invention claimed is:

1. A rotating electrical machine, comprising:
   a plurality of permanent magnets arranged along an inner peripheral surface of a cylindrical yoke at predetermined intervals in a circumferential direction;
   a magnet cover for covering an inner peripheral surface and both circumferential side surfaces of each of the plurality of permanent magnets, the magnet cover comprising locking portions on outer sides of both the circumferential side surfaces; and
   a magnet holder made of a non-magnetic material, which is formed by coupling a columnar portion provided between adjacent permanent magnets, for retaining each of the plurality of permanent magnets in the circumferential direction, and an annular portion for covering each axial side surface of each of the plurality of permanent magnets,
   wherein the magnet holder comprises, on an outer diameter side of both circumferential side surfaces of the columnar portion, engaging portions which engage with the respective locking portions of the magnet cover, and comprises, on an inner diameter side of each of both the circumferential side surfaces of the columnar portion, a first extending portion extending toward an inner peripheral surface of the magnet cover with a clearance with respect to the inner peripheral surface of the magnet cover.

2. A rotating electrical machine according to claim 1, wherein:
   the columnar portion and the first extending portion of the magnet holder form a corner portion having a round shape; and
   the following relationship is established, $$R1 < R2 < R3,$$

where R1 represents a curvature radius of the corner portion, R2 represents a curvature radius of a corner portion formed between the inner peripheral surface and a circumferential side surface of the magnet cover, and R3 represents a curvature radius of a corner portion formed between the inner peripheral surface and each of both the circumferential side surfaces of each of the plurality of permanent magnets.

3. A rotating electrical machine according to claim 1, further comprising a rotor which rotates on an inner peripheral side of each of the plurality of permanent magnets, wherein:
   each of the plurality of permanent magnets has a radial thickness set so that a circumferential center portion is thicker than both circumferential end portions; and
   a gap between a distal end portion of an inner peripheral surface of the first extending portion and the rotor has a dimension larger than a dimension of an air gap between a circumferential center portion of the inner peripheral surface of the magnet cover and the rotor.

4. A rotating electrical machine according to claim 1, wherein the magnet holder further comprises, on an inner diameter side of each corner portion formed by coupling the columnar portion and the annular portion, a second extending portion extending toward the inner peripheral surface of the magnet cover.

5. A rotating electrical machine according to claim 1, wherein the magnet holder further comprises, on an inner diameter side of a side surface of the annular portion, which covers corresponding one of the plurality of permanent magnets, a third extending portion axially extending toward the inner peripheral surface of the magnet cover.

6. A rotating electrical machine according to claim 5, wherein the third extending portion axially extending toward the inner peripheral surface of the magnet cover has a length set so that a circumferential center portion is smaller than both circumferential end portions.

* * * * *